(12) United States Patent
Miyaoh

(10) Patent No.: US 6,213,477 B1
(45) Date of Patent: Apr. 10, 2001

(54) METAL CYLINDER HEAD GASKET WITH PORTION FOR HOLDING INTERMEDIATE AREA BETWEEN CYLINDER BORES

(75) Inventor: Yoshio Miyaoh, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 09/382,200

(22) Filed: Aug. 23, 1999

(30) Foreign Application Priority Data

Sep. 8, 1998 (JP) ................................................. 10-254163

(51) Int. Cl.[7] .............................. F16J 15/08; F02F 11/00
(52) U.S. Cl. ............................................................ 277/598
(58) Field of Search .................................... 277/591, 594, 277/595, 598

(56) References Cited

U.S. PATENT DOCUMENTS

| 5,083,801 | * | 1/1992 | Okano et al. . |
| 5,131,668 | * | 7/1992 | Uchida . |
| 5,295,699 | | 3/1994 | Inoue . |
| 5,348,311 | * | 9/1994 | Miyaoh et al. . |
| 5,375,851 | * | 12/1994 | Mockenhaupt . |
| 5,408,963 | | 4/1995 | Miyaoh et al. . |
| 5,449,181 | | 9/1995 | Miyoh . |
| 5,806,857 | * | 9/1998 | Mockenhaupt et al. . |
| 6,027,124 | * | 2/2000 | Ishida et al. . |

OTHER PUBLICATIONS

Patent Abstracts of Japan, vol. 007, No. 041(M–194), Feb. 18, 1983 & JP57–190736A (Riyouta Kamakari), Nov. 24, 1982.

* cited by examiner

Primary Examiner—Anthony Knight
Assistant Examiner—John L. Beres
(74) Attorney, Agent, or Firm—Kanesaka & Takeuchi

(57) ABSTRACT

A metal laminate gasket for an internal combustion engine is formed of first, second and third metal plates laminated together. sealing devices are attached to the first metal plate, each having a curved portion for defining a cylinder bore, and a flange extending from the curved portion in a direction away from the cylinder bore. The second metal plate situated above the first metal plate has at least one notch between the cylinder bores, and the third metal plate situated above the second metal plate has an engaging portion between the cylinder bores. At least one holding portion is attached to the sealing device. The holding portion is located above the engaging portion to thereby allow the engaging portion to be located in the notch when the gasket is assembled. Thus, the engaging portion between the third holes is retained by the holding portion.

8 Claims, 3 Drawing Sheets

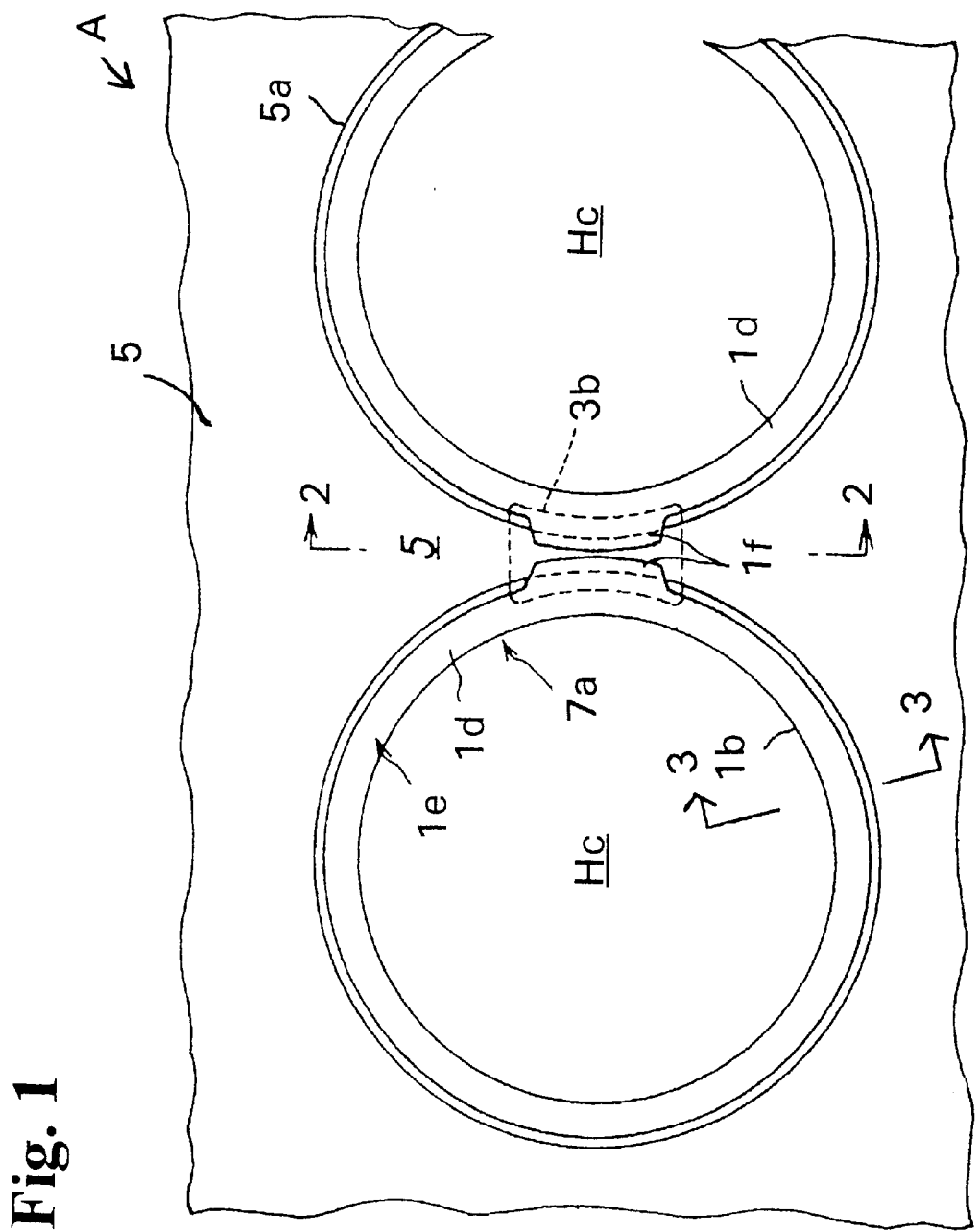

METAL CYLINDER HEAD GASKET WITH PORTION FOR HOLDING INTERMEDIATE AREA BETWEEN CYLINDER BORES

BACKGROUND OF THE INVENTION AND RELATED ART STATEMENT

The present invention relates to a metal cylinder head gasket with a portion for holding an intermediate area between cylinder bores.

Metal laminate gaskets have been widely used in internal combustion engines due to strength against high temperature and pressure generated in the cylinder bores. Since high temperature and pressure are generated in the cylinder bores when the engine is actuated, the cylinder head gasket is provided with sealing means around the cylinder bore. There are many kinds of the sealing means, one of which has a flange around the cylinder bore. The flange may be integrally formed with one of plates for constituting the gasket, or a part of a grommet installed in the cylinder bore. The surface pressure around the cylinder bore is made high by the flange when the gasket is installed in the engine.

In the gasket with the flange, the flange may be located on an upper plate of the gasket to hold the upper plate. In this case, the upper plate is properly retained by the flange without any trouble.

However, there may be a gasket such that the flange is exposed outwardly of the gasket without being located above the upper plate. Namely, the upper plate is not held by the flange of the gasket around the cylinder bore. This structure is taken when the thickness of the gasket and the length between the cylinder bores are limited.

Especially, in a gasket formed of three metal plates or more, an upper plate which is not held by a flange extending from a lower plate or grommet may be slightly raised upwardly away from a middle plate between the cylinder bores. Under the high pressure and high temperature condition, if the middle portion between the cylinder bores is vibrated or subjected to high load repeatedly, the middle portion is weakened, so that the middle portion may be damaged or broken by fatigue destruction or fretting.

In view of the above, U.S. Pat. No. 5,295,699 was made. As shown in FIG. 6, the gasket is formed of two metal plates 110, 111.

The metal plate 110 has flanges 112 around cylinder bores Hc, and a pair of holes 116 at both sides of a middle portion 117 between the flanges 112. In the metal plate 111, one hole with projections 118 is formed without forming individual holes for the cylinder bores Hc. The projections 118 are inserted into the holes 116 to fix the projections 118 to the plate 110, so that the projections 118 do not deform nor vibrate.

However, in the above gasket, when the gasket is assembled, 20 the projections 118 must be inserted into the holes 116. Since the projections 118 face each other, the procedure for inserting the projections 118 into the holes 116 is relatively complicated.

The present invention has been made in view of the above, and an object of the invention is to provide a metal cylinder head 25 gasket, wherein an upper plate between the cylinder bores gasket can be securely held without raising upwardly.

Another object of the invention is to provide a metal cylinder head gasket as stated above, wherein the upper plate between the cylinder bores is not damaged by vibration or load repeatedly applied thereto.

A further object of the invention is to provide a metal cylinder head gasket as stated above, wherein the gasket can be easily formed and assembled together.

Further objects and advantages of the invention will be apparent from the following description of the invention.

SUMMARY OF THE INVENTION

A metal laminate gasket of the invention is used for an internal combustion engine having cylinder bores. The gasket is basically formed of first, second and third metal plates laminated together, and includes sealing means.

In particular, the first metal plate extends substantially throughout an entire area of the gasket, and the sealing means is attached to the first metal plate. The sealing means includes curved portions for defining first holes for the respective cylinder bores, and flanges extending from the curved portions in the directions away from the first holes.

The second metal plate is situated above the first metal plate, and includes second holes for the cylinder bores and at least one notch between the second holes. The third metal plate is situated above the second metal plate, and includes third holes for the cylinder bores and an engaging portion between the third holes.

In the gasket of the invention, at least one holding portion is formed in the sealing means. The holding portion is located above the engaging portion to thereby allow the engaging portion to be located in the at least one notch when the gasket is assembled.

Thus, the engaging portion between the third holes is retained by the holding portion.

In the invention, when the gasket is assembled, the holding portion is disposed above the engaging portion of the third metal plate. Therefore, the engaging portion or intermediate area between the cylinder bores of the third plate is securely held by the holding portion. The intermediate area does not project upwardly nor damaged when the gasket is used. In this respect, the flange is located above the second metal plate around the second hole, and does not overlap the third metal plate around the third hole.

In the invention, the notch is located under the engaging portion. When the gasket is compressed at the time of final assembly step or installation, the engaging portion is pushed to be located in the notch of the second metal plate. Therefore, the intermediate area does not project outwardly, and the sealing means projects slightly above the surface of the gasket to provide high surface pressure thereat.

The holding portion may be a flap extending from the flange and located above the engaging portion. In this case, the flap in one sealing means faces a flap of another sealing means situated adjacent thereto. The two flaps are located above the engaging portion.

The sealing means may be integrally formed with the first meal plate so that the curved portion extends from the first metal plate. On the other hand, the sealing means may be a grommet situated in the first to third holes communicating each other. In this case, the grommet in one sealing means is integrally formed with a grommet in another sealing means adjacent thereto through a connecting portion forming the at least one holding portion.

BRIEF DESCRIPTION OF THE DRAWINGS

FIG. 1 is an explanatory plan view of a first embodiment of a cylinder head gasket of the invention;

DETAILED DESCRIPTION OF PREFERRED EMBODIMENTS

Figure 2:
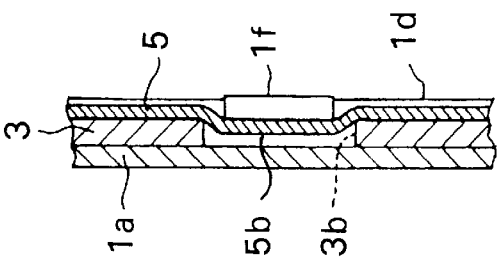
FIG. 2 is an enlarged sectional view taken along line 2—2 in FIG. 1.
Figure 3:
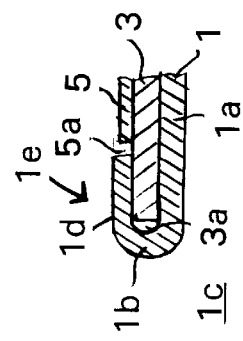
FIG. 3 is an enlarged sectional view taken along line 3—3 in FIG. 1.
Figure 6:
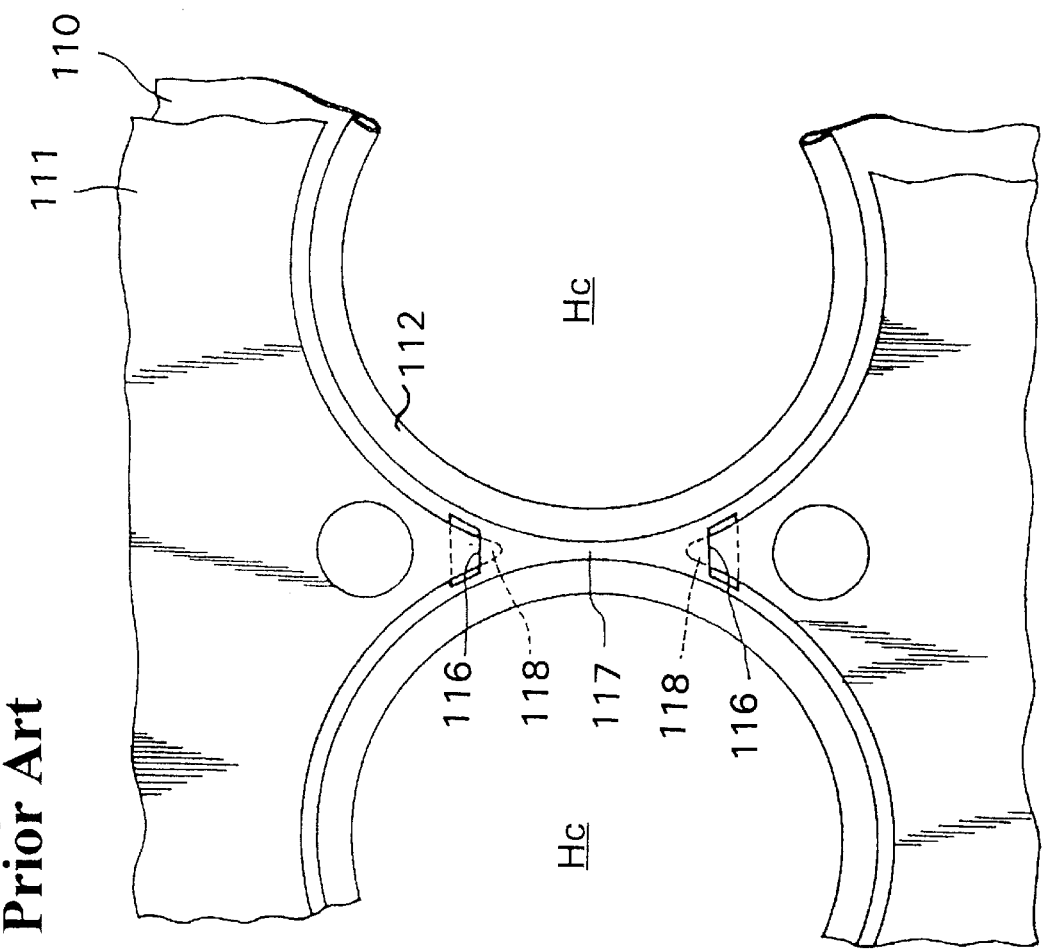
FIG. 6 is an explanatory plan view for showing a conventional cylinder head gasket.

With reference to FIGS. 1–3, a first embodiment A of a metal laminate type cylinder head gasket of the invention is explained.

The gasket A includes a plurality of cylinder bores Hc, water holes, bolt hole, oil holes and so on, as in the conventional gasket. However, for convenience, cylinder bores Hc are only shown in the drawings.

The gasket A is formed of lower, middle and upper metal plates 1, 3, 5 laminated together and extending substantially throughout an entire area of the gasket. The lower plate 1 includes a base portion 1a, a curved portion 1b extending upwardly from the base portion 1a to define a hole 1c for the cylinder bore Hc, and a flange 1d extending from the curved portion 1b. The curved portion 1b and the flange 1d constitute sealing means 1e around the cylinder bore Hc. Also, the flange 1d includes a flap 1f at an intermediate area 7a between the cylinder bores Hc.

The middle plate 3 has a shape substantially corresponding to that of the base portion 1a of the lower plate 1. The middle plate 3 includes a hole 3a situated adjacent to the curved portion 1b, and a notch 3b at the intermediate area 7a between the cylinder bores Hc. The notch 3b is indicated in dot lines in FIG. 1. When the gasket is assembled, the middle plate 3 is sandwiched between the base portion 1a and the flange 1d.

The upper plate 5 has a shape generally corresponding to that of the middle plate 3, and includes holes 5a for the cylinder bore Hc. The diameter of the hole 5a is greater than the outer diameter of the flange 1d. Therefore, when the gasket is assembled, the upper plate 5 does not overlap the flange 1d and is located laterally outside the flange 1d. Also, at the intermediate area 7a between the cylinder bores Hc, an engaging portion or intermediate portion 5b of the upper plate 5 is located under the flaps 1f of the flanges 1d situated adjacent to each other.

In this connection, the sizes of the flaps 1f are slightly smaller than the notch 3b formed in the middle plate 3. Thus, in assembling the gasket, the engaging portion 5b between the holes 5a 25 is located in the notch 3b, and the outer surface of the engaging portion 5b is held by the flaps 1f.

When the gasket is formed, the lower plate 1 is prepared in the condition that the curved portion 1b and the flange 1d are not bent. Also, the middle and upper plates 3, 5 are prepared. After the lower, middle and upper plates 1, 3, 5 are laminated, the curved portions 1b are bent so that the flanges 1d are placed on the parts of the middle plate 3. As a result, though the edges around the holes 5a are not laminated by the flanges 1d, the flaps 1f are disposed on the engaging portion 5b of the upper plate 5 while the engaging portion 5b is pushed to be located in the notch 3b. Accordingly, the lower, middle and upper plates 1, 3, 5 are united together without disassembly of the plates.

In the gasket A, since the flaps 1f are located at the engaging portion or intermediate portion 5b of the upper plate between the cylinder bores, the intermediate portion 5b is held by the flaps 1f. Since the intermediate portion 5b is partly located in the notch 3b, the surface pressure at the intermediate portion 5b is lower than that at the flange around the cylinder bores. Thus, the flange can securely seal around the cylinder bores. Since the intermediate portion does not raise in use, the intermediate portion is not damaged or broken by fatigue destruction or fretting.

Figure 4:
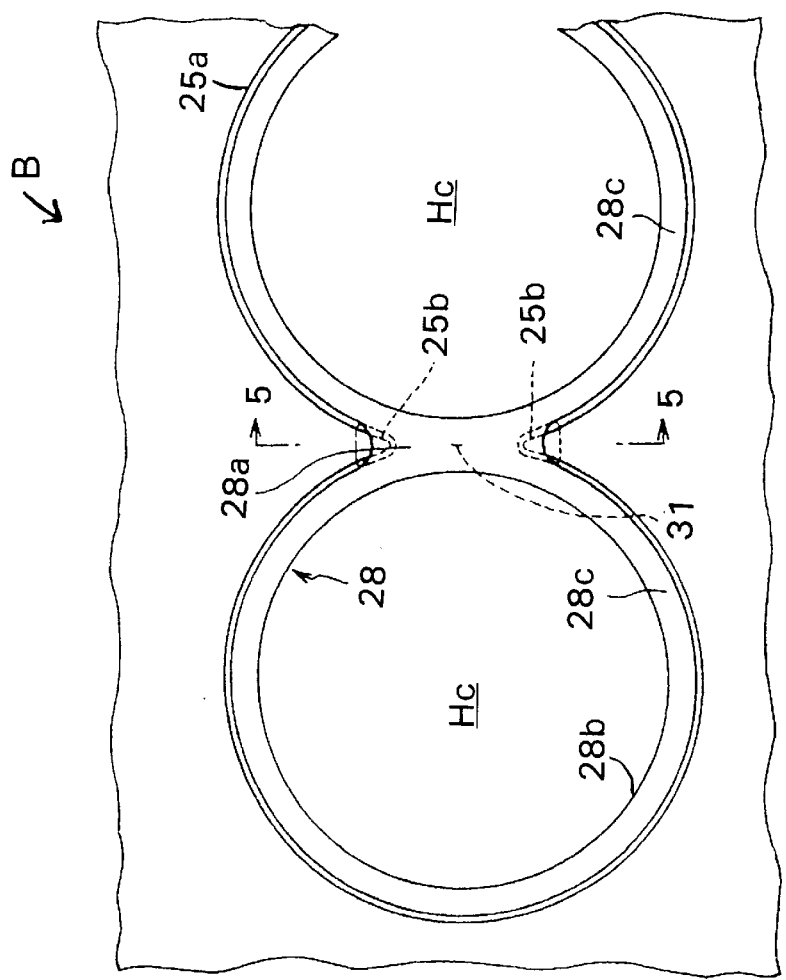
FIG. 4 is an explanatory plan view of a second embodiment of a cylinder head gasket of the invention.
Figure 5:
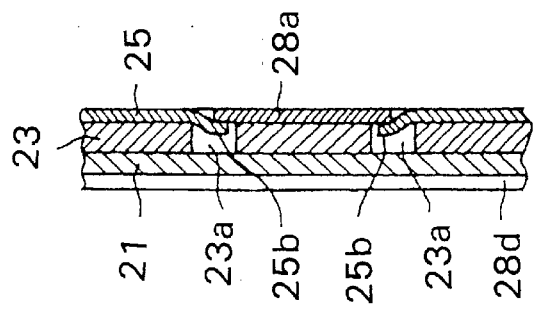
FIG. 5 is an enlarged sectional view taken along line 5—5 in FIG. 4.

FIGS. 4 and 5 show a second embodiment B of the metal laminate type cylinder head gasket of the invention. The gasket B is formed of lower, middle and upper plates 21, 23, 25, as in the gasket A. However, the lower plate 21 does not have a curved portion and flange, and has a shape substantially the same as that of the middle plate 23. The middle plate 23 has two notches 23a instead of one notch in the gasket A. In the upper plate 25, there are no individual holes for the cylinder bores, but instead, one hole 25a with projections 25b is formed. Namely, a portion 31 is not formed between the projections 25b.

In the gasket B, instead of the curved portion and flange in the gasket A, grommets 28 connected each other at a connecting portion 28a are used. The grommet 28 has a curved portion 28b for defining the cylinder bore Hc, and two flanges 28c, 28d on both sides of the curved portion 28b. The flange 28c in one grommet is connected to the flange of the adjacent grommet through the connecting portion 28a.

When the gasket B is assembled, the lower, middle and upper plates 21, 23, 25 are laminated together. The grommets 28 are prepared such that the flanges 28d orient substantially perpendicular to the flanges 28c through the curved portions 28b. The grommets 28 thus prepared are placed on the upper plate 25, and the flanges 28d and curved portions 28b are inserted into the holes of the plates 21, 23, 25 for the cylinder bores Hc. Then, the flanges 28d are bent at the curved portions 28b, wherein the lower and middle plates are sandwiched between the flanges 28c, 28d of the grommet 28, while the projections 25b of the upper plate 25 are bent and inserted into the notches 23a of the middle plate and held under the connecting portion 28a of the grommet. Thus, the upper plate 25 is also held by the grommet 28.

In the gasket B, since the cylinder bores Hc are formed relatively close to each other, the portion 31 between the projections 25b is not formed in the upper plate 25. However, the projections 25b located between the cylinder bores Hc are disposed in the notches 23a and held by the connecting portion 28a of the grommet 28. Therefore, when the gasket is assembled, all the plates and grommets are connected each other. The projections 25b are properly fixed by the connecting portion 28a, and do not raise in use, so that the projections are not damaged or broken by fatigue destruction or fretting.

In the above embodiments, the gasket is formed of three metal plates, but the above structure may be applied for the gasket more than three metal plates.

In the invention, the upper plate or projections of the upper plate located between the cylinder bores are held by the holding portion, i.e. flaps and connecting portion of the flange or grommet, so that the upper plate or projections do not raise in use and are properly fixed to the main part of the gasket. Since the upper plate and the projections are located in the notches formed larger than the required size, a high surface pressure for sealing the cylinder bore is formed at the flange. The upper plate and the projections are not damaged or broken by fatigue destruction or fretting.

While the invention has been explained with reference to the specific embodiments of the invention, the explanation is illustrative and the invention is limited only by the appended claims.

What is claimed is:

1. A metal laminate gasket for an internal combustion engine having cylinder bores therein, comprising:
   a first metal plate extending substantially throughout an entire area of the gasket,
   sealing means attached to the first metal plate and having curved portions for defining first holes for the respective cylinder bores, and flanges extending from the curved portions in directions away from the first holes,
   a second metal plate situated above the first metal plate and having second holes for the cylinder bores and at least one notch between the second holes,
   a third metal plate situated above the second metal plate and having third holes for the cylinder bores and an engaging portion between the third holes, and
   at least one holding portion attached to the sealing means, said at least one holding portion being located above the engaging portion to thereby allow the engaging portion to be located in the at least one notch when the gasket is assembled so that the engaging portion between the third holes is retained by the at least one holding portion.

2. A metal laminate gasket according to claim 1, wherein said at least one notch is located under the engaging portion to substantially completely receive the engaging portion therein.

3. A metal laminate gasket according to claim 2, wherein said flange is located above the second metal plate around the second hole, and does not overlap the third metal plate around the third hole.

4. A metal laminate gasket according to claim 3, wherein said at least one holding portion is a flap extending from the flange and located above the engaging portion.

5. A metal laminate gasket according to claim 4, wherein said flap in one sealing means faces a flap of another sealing means situated adjacent thereto, said two flaps being located above the engaging portion.

6. A metal laminate gasket according to claim 5, wherein said sealing means is integrally formed with the first metal plate so that the curved portion extends from the first metal plate.

7. A metal laminate gasket according to claim 3, wherein said sealing means is a grommet defining the first to third holes communicating with each other, said grommet in one cylinder bore being integrally formed with a grommet in an adjacent cylinder bore by a connecting portion forming th e at least one holding portion.

8. A metal laminate gasket according to claim 7, wherein said second metal plate has two notches, and the third holes of the third metal plate communicate with each other to form edge portions facing each other at a portion between the third holes, said edge portions being located in the notches.

* * * * *

UNITED STATES PATENT AND TRADEMARK OFFICE
CERTIFICATE OF CORRECTION

PATENT NO.   : 6,213,477 B1
DATED        : April 10, 2001
INVENTOR(S)  : Yoshio Miyaoh Page 1 of 1

It is certified that error appears in the above-identified patent and that said Letters Patent is hereby corrected as shown below:

Title page,
Section (57) Abstract,
Line 3, change "sealing" to -- Sealing --.

Column 1,
Line 55, delete "20";
Line 61, delete "25";

Column 2,
Line 55, change "meal" to -- metal --;

Column 3,
Line 52, delete "25";
Line 61, change "id" to -- 1d --;
Line 66, change "if" to -- 1f --; and Column 4,
Line 2, change "if" -- 1f --.

Signed and Sealed this

Eleventh Day of September, 2001

Attest:

NICHOLAS P. GODICI
Attesting Officer   *Acting Director of the United States Patent and Trademark Office*

UNITED STATES PATENT AND TRADEMARK OFFICE
CERTIFICATE OF CORRECTION

PATENT NO. : 6,213,477 B1
DATED : April 10, 2001
INVENTOR(S) : Yoshio Miyaoh

It is certified that error appears in the above-identified patent and that said Letters Patent is hereby corrected as shown below:

Title page,
Section (57) Abstract,
Line 3, change "sealing" to -- Sealing --.

Column 1,
Line 55, delete "20";
Line 61, delete "25";

Column 2,
Line 55, change "meal" to -- metal --;

Column 3,
Line 52, delete "25";
Line 61, change "id" to -- 1d --;
Line 66, change "if" to -- 1f --; and Column 4,
Line 2, change "if" -- 1f --.

Signed and Sealed this

Eleventh Day of September, 2001

Attest:

NICHOLAS P. GODICI
Attesting Officer
*Acting Director of the United States Patent and Trademark Office*